(12) United States Patent
Clark et al.

(10) Patent No.: US 8,785,549 B2
(45) Date of Patent: Jul. 22, 2014

(54) COMPOSITION FOR SEALING A COLORANT TO A SURFACE AND/OR FOR PROTECTING A SURFACE

(71) Applicant: S.C. Johnson & Son, Inc., Racine, WI (US)

(72) Inventors: Paul A. Clark, Racine, WI (US); Holly Ann St. Martin, Kenosha, WI (US); Cary E. Manderfield, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 29 days.

(21) Appl. No.: 13/645,815

(22) Filed: Oct. 5, 2012

(65) Prior Publication Data

US 2014/0100329 A1 Apr. 10, 2014

(51) Int. Cl.
 C08L 75/00 (2006.01)
 B05D 3/00 (2006.01)
 B05D 7/00 (2006.01)

(52) U.S. Cl.
 USPC ............... 524/590; 427/389.9; 427/407.1

(58) Field of Classification Search
 USPC .................. 427/407.1, 389.9; 524/590
 See application file for complete search history.

(56) References Cited

U.S. PATENT DOCUMENTS

| | | | |
|---|---|---|---|
| 4,096,303 A | 6/1978 | Doerfling | |
| 4,160,686 A | 7/1979 | Niederdellmann et al. | |
| 4,620,993 A | 11/1986 | Suss et al. | |
| 5,024,674 A | 6/1991 | Prelini et al. | |
| 5,045,375 A | 9/1991 | Davis et al. | |
| 5,312,863 A | 5/1994 | Van Rheenen et al. | |
| 5,330,540 A | 7/1994 | McBride et al. | |
| 5,334,420 A | 8/1994 | Hartung et al. | |
| 5,383,959 A * | 1/1995 | Sirdesai et al. | ............ 106/31.21 |
| 5,520,998 A | 5/1996 | Uemoto et al. | |
| 5,565,243 A | 10/1996 | Mauer et al. | |
| 5,985,369 A | 11/1999 | Kerkmann et al. | |
| 6,080,687 A | 6/2000 | Ishwarlal | |
| 6,177,496 B1 | 1/2001 | Luzon | |
| 6,322,851 B1 | 11/2001 | Adachi et al. | |
| 6,645,565 B2 | 11/2003 | Veiga | |
| 6,713,131 B2 | 3/2004 | Blackwood et al. | |
| 6,890,602 B2 | 5/2005 | Romani | |
| 7,423,002 B2 | 9/2008 | Shah et al. | |
| 7,485,588 B2 | 2/2009 | Wang et al. | |

(Continued)

FOREIGN PATENT DOCUMENTS

WO 00/03593 1/2000

OTHER PUBLICATIONS

Product DATAsheet of Bayhydrol UH2558 by Bayer Material Science, Apr. 2009.*
MSDS of Bayhydrol 140AQ of Bayer, 2012.*

*Primary Examiner* — Aiqun Li (57) ABSTRACT

A protective sealant composition that is useful for sealing a colorant to a substrate, such as carpet. The protective sealant composition is formulated such that, upon drying, the composition forms a topcoat on the surface of the substrate, with the topcoat having a hard component and a soft component. The composition provides a durable protection against color fading and resoiling to the applied colorant, as well as to the rest of the surface of the substrate. The composition also provides wear resistance to the carpet by reducing the amount that the widths of the top ends of carpet fibers increase when subjected to wearing.

17 Claims, 1 Drawing Sheet

(56) References Cited

U.S. PATENT DOCUMENTS

| | | |
|---|---|---|
| 7,556,841 B2 | 7/2009 | Kimball et al. |
| 7,727,289 B2 | 6/2010 | Frazee et al. |
| 7,763,083 B2 | 7/2010 | Kimball et al. |
| 7,776,108 B2 | 8/2010 | Shah et al. |
| 7,780,744 B2 | 8/2010 | Shah et al. |
| 7,794,796 B2 | 9/2010 | Feng et al. |
| D627,224 S | 11/2010 | Bass et al. |
| 7,829,146 B2 | 11/2010 | Shah et al. |
| 7,871,944 B2 | 1/2011 | Sanders et al. |
| D635,854 S | 4/2011 | Bass et al. |
| 7,947,640 B2 | 5/2011 | Shah et al. |
| 7,985,797 B2 | 7/2011 | Kitagawa et al. |
| 8,003,171 B2 | 8/2011 | Huang |
| 8,043,713 B2 | 10/2011 | Wevers et al. |
| 8,048,517 B2 | 11/2011 | Kimball et al. |
| 8,061,269 B2 | 11/2011 | Bass et al. |
| 8,087,548 B2 | 1/2012 | Bass et al. |
| 2001/0001753 A1 | 5/2001 | Nelson et al. |
| 2003/0148061 A1 | 8/2003 | Doesburg et al. |
| 2005/0026525 A1 | 2/2005 | Vollbrecht et al. |
| 2007/0089621 A1 | 4/2007 | Kimball et al. |
| 2008/0282642 A1 | 11/2008 | Shah et al. |
| 2008/0311809 A1 | 12/2008 | Grynaeus et al. |
| 2009/0021415 A1 | 1/2009 | Yu et al. |
| 2009/0148683 A1 | 6/2009 | Ilfrey |
| 2010/0001992 A1 | 1/2010 | Schultz et al. |
| 2010/0119720 A1 | 5/2010 | Vestergaard Frandsen et al. |
| 2010/0154146 A1 | 6/2010 | Shah et al. |
| 2010/0256263 A1 | 10/2010 | Shah et al. |
| 2011/0038826 A1 | 2/2011 | Kimball et al. |
| 2011/0078862 A1* | 4/2011 | Kashiwagura et al. ........ 8/94.21 |
| 2011/0097506 A1 | 4/2011 | Shah et al. |
| 2011/0195229 A1 | 8/2011 | Tone et al. |
| 2011/0200820 A1 | 8/2011 | Peng et al. |
| 2011/0236587 A1* | 9/2011 | Clark et al. ................ 427/407.1 |
| 2012/0006213 A1 | 1/2012 | Bass et al. |
| 2012/0156952 A1 | 6/2012 | Ardiff et al. |

\* cited by examiner

COMPOSITION FOR SEALING A COLORANT TO A SURFACE AND/OR FOR PROTECTING A SURFACE

BACKGROUND

1. Field of the Invention

Our invention relates to a composition and a method of using such a composition. More specifically, our invention relates to a sealant composition that is useful in a process of applying a colorant to a surface, such as carpet, with the composition also being effective to provide protection to the surface and being effective to impart wear resistance to the surface.

2. Background

Coloring compositions have been developed to enable consumers to make personalized designs and patterns in carpet. Such carpet coloring compositions, for example, allow consumers to rejuvenate a worn or faded carpet surface with new colors. Thus, carpet coloring compositions present an attractive consumer product. Examples of such carpet coloring compositions are sold by the assignee of the present application under the tradename VECCO™.

Most carpet coloring compositions comprise one or more colorant(s) that include a coloring agent, such as dyes, toners, powder paints, inks, etc. These coloring compositions, by themselves, will not generally adhere or affix to most types of carpet. Therefore, after a coloring composition is applied to a carpet surface, it often necessary to use some process to permanently affix the coloring composition to the carpet. Often, a sealant composition is used, with the sealant composition being applied to the coloring composition so as to affix the coloring composition to the carpet surface. When applied to a carpet surface, however, the sealant composition often has the side effect of attracting dirt or other undesirable matter. Thus, carpet coloring kits often include instructions that indicate that the sealant should only be applied to the portion of the carpet to which the colorant is applied. Further, some carpet coloring kits include templates for a consumer to use in order to prevent the sealant composition from spreading to the portions of the carpet surface that do not receive the colorant.

There are many known products for protecting the color of a carpet surface and for repelling dirt from the carpet surface. Two examples of such carpet protecting products are SCOTCHGARD™ Carpet and Rug Protector by 3M Company of St. Paul, Minn., and VECTRA® carpet spray by Vectra Spray of Atlanta, Ga. Other types of coatings that are often applied to a coloring composition that is sealed to a carpet are protective coatings. Such protective coatings may, for example, add durability to colored carpet so as to reduce fading of the color over time. The coloring composition protective coatings may also reduce the attraction of dirt or other undesirable matter on the carpet, including reducing the incidence of resoiling of the uncolored regions of the carpet due to the residual sealant.

Besides accumulating dirt and other undesirable matter, wearing from traffic is another way in which the appearance of carpet can degrade over time. In many cases, clear differences in both colored and non-colored portions of a carpet surface can be seen over time between high traffic areas of a carpet and lower traffic areas. Such differences are generally considered to be unattractive.

It would be beneficial, therefore, to provide a composition that combines the functions of sealant compositions and protective coatings. That is, it would be beneficial to provide a composition that can both seal a colorant that is applied to a carpet surface, and also subsequently protect the carpet by reducing fading of the color over time and preventing resoiling. It would further be beneficial to provide a composition that imparts wear resistance to both colored and non-colored portions of a carpet surface.

SUMMARY OF THE INVENTION

According to one aspect of our invention, a composition is provided for sealing a colorant that is applied a polyester fiber carpet. The composition seals and protects a portion of the carpet to which the colorant is applied such that, after the carpet is walked on by 30,000 steps and vacuumed by 600 strokes, the $\Delta E_{cmc}$ (1:c=2:1) of the portion of the carpet to which the colorant is applied is less than about 6.0. Further, the $\Delta C_{CMC}$ of the portion of the carpet to which the colorant is applied is less than about −3.0 D.

According to another aspect of our invention, a composition is provided that prevents color change in a polyester fiber carpet. The composition protects against color change in a portion of the carpet such that, after the carpet is walked on by 30,000 steps and vacuumed by 600 strokes, the $\Delta E_{CMC}$ (1:c=2:1) of the portion of carpet is less than about 3.0. Further, the $\Delta C_{CMC}$ of the portion of the carpet is less than about −2.0 D.

According to a further aspect of our invention, a composition is provided for sealing and protecting a colorant that is applied to a polyester fiber carpet and for protecting the polyester fiber carpet. The composition seals and protects a portion of the carpet to which no colorant is applied such that, after the carpet is walked on by 30,000 steps and vacuumed by 600 strokes, the $\Delta E_{CMC}$ (1:c=2:1) of the no colorant portion of the carpet is less than about 3.0, and the $\Delta C_{CMC}$ of the no colorant portion of the carpet is less than about −2.0 D. Further, the composition seals the colorant to the carpet such that the $\Delta E_{CMC}$ (1:c=2:1) of the portion of the carpet to which the colorant is applied is less than about 1.55 after the portion of carpet to which the colorant is applied is vacuumed by 100 strokes.

DETAILED DESCRIPTION OF THE INVENTION

Our invention relates to a protective sealant composition that is useful in a process of applying a colorant to the surface of a substrate, useful in protecting the surface from fading over time, and also useful in imparting a wear resistance to the surface. In particular, the protective sealant composition will be described in the context of applying a colorant to a carpet. As will be readily appreciated by those skilled in the art, however, the protective sealant may be used with other types of substrates, such as a rug, upholstery, furniture, etc. Moreover, in the examples below, the sealant composition tests were conducted with polyester fiber carpeting. The protective sealant composition, however, is not limited to being used with any particular type of carpet, and in fact, can be used with numerous types of carpet.

In one embodiment, a composition is provided that both seals colorants and provides a protective coating for the carpet or other substrate to which the composition is applied, and also provides wear resistance to the surface to which the composition is applied. The combination of sealing, protecting, and imparting wear resistance is beneficial for many reasons. For example, the dual functionality of a protective sealant composition eliminates at least one application step that is required if separate sealing and protecting compositions are used. Moreover, wear resistance can also be imparted at the same time, thereby eliminating the need for further treatment steps.

As another example of the benefit from the combined protecting, sealing, and wear resistance functions, it has been found that some sealant compositions by themselves will attract dirt or other matter when walked upon, i.e., resoiling. Therefore, users are often instructed to apply such sealant compositions to a specific area, for example, with a template. Due to the protective functionality, the protective sealant composition described herein can be applied to both a portion of a surface with colorant and a portion of a surface without colorant. It follows that a resulting benefit from the application to portions of the surface without colorant is that the protective portion of the composition prevents resoiling in the non-colored portions of the surface.

Without being bound by any theory, we believe that the protective sealant compositions described herein function in a sequential manner so as to first cause colorant particles to coalesce and to flow into a thin film on the surface to which the colorant and protective sealant composition are applied, e.g., carpet fibers. Afterwards, upon evaporation of the evaporative polymer solubilizing material, the remaining protective sealant composition forms a topcoat coating on the surface to which the protective sealant composition is applied. The final result is a polymeric material that has been permanently affixed to the surface, with a topcoat being formed on the surface. The protective sealant composition described herein is formulated such that the topcoat has both a hard component and a soft component. The combination of hard and soft components in the topcoat provides a balance of durability and resoil resistance in the surface to which the composition is applied. More specifically, the soft topcoat component provides durability and resistance to impact, abrasion, and other wear and tear. At the same time, the hard topcoat component provides resistance to resoiling. Still further, the formulation of the composition imparts a certain amount of wear resistance to the surface.

An example of a protective sealant composition according to the invention may include a first film forming dispersion, a second film forming dispersion, one or more solvents, and one or more surfactants. The sealant and protectant composition may include additional components, such as pH buffers, antibacterials, antifungals, free radical scavengers, and UV light absorbers. Each of these constituents of the protective sealant composition will be described in detail below.

The combination of film forming dispersions of the protectant sealant composition form the above-described topcoat on the surface, upon evaporation of the evaporative solubilizing material in the composition. In a particular embodiment, the composition includes first and second film forming polyurethane dispersions. One of the polyurethane dispersions functions to form the above-described soft component, while the other of the polyurethane dispersions functions to form the hard component in the topcoat of the applied composition.

Specific examples of film forming polyurethane dispersions that provide the soft topcoat component include aromatic and aliphatic polyurethane resin solutions and aqueous polyurethane dispersions. More specifically, aliphatic polyester-polyether polyurethane dispersions sold under the tradename IMPRANIL® by Bayer MaterialScience of Leverkusen, Germany can be used as a constituent in the protective sealant composition, such as IMPRANIL® DLU and IMPRANIL® DLC-F. Another nonlimiting example is IMPRANIL® DLP, also by Bayer MaterialScience.

Specific examples of film forming polyurethane dispersions that provide the hard topcoat component in the topcoat include aliphatic, anionic polyurethane dispersions, such as those sold under the tradename BAYHYDROL® by Bayer MaterialScience, with a specific example being BAYHYDROL® UH 2558. Another nonlimiting example includes BAYHYDROL® UH 2557, also by Bayer MaterialScience.

In conjunction with the polyurethane dispersions, the protective sealant composition may include one or more surfactants for maintaining the dispersions. For example, when an aliphatic polyester-polyether polyurethane dispersion such as IMPRANIL® DLU is used, a sodium lauryl sulfate surfactant may be included in the composition, such as the surfactant sold under the tradename STEPANOL® WA-EXTRA PCK by Stepan Company of Northfield, Ill.

The protective sealant composition also includes a solvent for dissolving the colorant particles and/or thermoplastic resin contained in the colorant. The dissolved colorant then flows onto and/or into the substrate to which the protective sealant is applied. In the case of carpeting, the particles of colorant dissolved in the film may flow into the recesses or crevasses in the carpet fibers, and possibly penetrate into the carpet fibers, thereby forming a thin, even coating on the fibers. The solvent is evaporated by drying subsequent to the application of the protective sealant composition.

Examples of solvents that are useful in the protective sealant composition include polar and/or nonpolar solvents, such as those disclosed in the Handbook of Organic Solvent Properties, Smallwood, I. M. 1996, Elsevier. Such solvents include, for example, water, aliphatic hydrocarbons, aromatic hydrocarbons, aliphatic hydrocarbon solvents such as aliphatic alcohols, other alcohols, glycol ethers, pyrrolidone, nitrated and chlorinated solvents such as chlorinated hydrocarbons, ketones, ethers, and esters. Other useful solvents include acetone, amines, benzyl acetate, phenols, and the organic sulfone or sulfoxide families including dimethyl sulfoxide. Any solvent may be selected that is appropriate for the colorant as long as the solvent acts to aid in affixation. Illustrative solvents contemplated include, for example, those available from The Dow Chemical Company of Midland, Mich. under the CARBITOL®, CELLOSOLVE®, DOWANOL®, and PROGLYDE® trade names including, for example, diethylene glycol ethyl ether available from Dow Chemical as CARBITOL®, diethylene glycol monobutyl ether available from Dow Chemical as Butyl CARBITOL®, ethylene glycol monohexyl ether, available from Dow Chemical as Hexyl CELLOSOLVE®, ethylene glycol monoethyl ether acetate available from Dow Chemical as Ethyl CELLOSOLVE® Acetate, ethylene glycol n-butyl ether acetate available from Dow Chemical as Butyl CELLOSOLVE®. Acetate, propylene glycol monomethyl ether acetate available from Dow Chemical as DOWANOL® PMA, dipropylene glycol monomethyl ether acetate available from Dow Chemical as DOWANOL® DPMA, dipropylene glycol mono (n-butyl)ether available from Dow Chemical as DOWANOL® DPnB, dipropylene glycol propyl ether available from Dow Chemical as DOWANOL® DPnP glycol ether, propylene glycol diacetate available from Dow Chemical as DOWANOL® PGDA, propylene glycol methyl ether available from Dow Chemical as DOWANOL® PM, propylene glycol n-butyl ether available from Dow Chemical as DOWANOL® PNB, dipropylene glycol methyl ether available from Dow Chemical as DOWANOL® DPM, ethylene glycol phenyl ether available from Dow Chemical as DOWANOL® EPH, dipropylene glycol dimethyl ether available from Dow Chemical as PROGLYDE® DMM glycol diether. Additional solvents include ethylene glycol diacetate and ethyl lactate available from Purac under the PURASOLV® EL tradename. Still further solvents include diethylene glycol mono propyl ether available from Eastman Chemical Company of Kingsport, Tenn., under the EASTMAN® DP trade name. Other examples of solvents include ester alcohols, such as 2,2,4-trimethyl pentane 1,3-diol monoisobutyrate sold under the tradename TEXANOL™ by Eastman Chemical Company.

Combinations and mixtures of the above-described solvents may also be used. Examples of solvent mixtures useful with the present invention include mixtures of hexyl cellosolve and ethyl lactate, mixtures of butyl carbitol and propylene glycol diacetate, mixtures of hexyl cellosolve, propylene glycol diacetate, and ethyl lactate, mixtures of hexyl cellosolve, propylene glycol diacetate, dipropylene glycol monobutyl ether, and mixtures of propylene glycol diacetate and dipropylene glycol monobutyl ether. The mixtures may also include any other solvent or additive that is compatible with affixing the colorant to the surface. In a specific embodiment, the protective sealant composition includes the combination of 2,2,4-trimethyl pentane 1,3-diol monoisobutyrate (TEXANOL™) and dipropylene glycol n-butyl ether (DOWANOL® DPnB glycol ether).

In another embodiment, setting solutions may act as solubilizing agents or sealants and may incorporate one or more solvent systems, which include one or more glycol solvents capable of solubilizing at least one of a polymer or a resin. Solvent systems may further include additional components to facilitate formulation, as well as functional, dispersant, and storage properties of the solvent system or the solubilizing agents or sealants. Non-limiting examples of additional components that may be included in contemplated solvent systems include polar and/or nonpolar solvents, water, wax, hydrocarbons, ethanol, phosphorous esters, benzyl alcohol, isopropyl alcohol, diacetone alcohol, ethyl lactate, a nitrated solvent, a chlorinated solvent, a chlorinated hydrocarbon, a ketone, an ester, acetone, an amine, benzyl acetate, a phenol, an organic sulfone, and dimethyl sulfoxide.

In conjunction with the solvent system, the protective sealant composition may include one or more surfactants to disperse any insoluble solvents in the rest of the composition. Examples of such surfactants include acrylic polymers and copolymers, for example, hydrophobically-modified acrylic copolymers. Examples of surfactants that may be used include CARBOPOL®-type polymers including PEMULEN™ polymers available from Lubrizol Company of Wickliffe, Ohio, such as PEMULEN™ 1622 and PEMULEN™ TR-2, which are polyacrylic acid/methacrylate block copolymers. Additional suitable surfactants include ARISTOFLEX® AVC available from Clariant Company of Charlotte, N.C.

The protective sealant composition may also include corrosion inhibitors such as one or more pH buffers. For example, when the protective sealant composition is to be dispensed using an aerosol canister, the composition may include pH buffers such as potassium phosphate dibasic and potassium phosphate monobasic. Surprisingly, we have found that inclusion of the potassium phosphate dibasic and potassium phosphate monobasic buffers has tended to provide certain embodiments of the resultant formulation with a relatively high stability. Those skilled in the art will recognize numerous other pH buffers that could be used.

The protective sealant composition may further include preservatives such as biocides. Examples of such biocides include antifungals and antibacterials. More specific examples include isothiazolinone-based antifungals, such as 3-iodo-2-propynl butyl carbamate sold under the tradename ACTICIDE® available from Thor Specialties, Inc., of Trumbull, Conn., and oxazolidine antibacterials, such as the 4,4-dimethyloxazolidine-based biocide sold under the tradename BIOBAN™ CS-1135 by the Dow Chemical Company of Midland, Mich. Those skilled in the art will recognize the numerous other preservatives that could be included in the protective sealant composition.

The protective sealant composition may still further include light stabilizing additives to filter harmful UV light and/or act as free radical scavengers. Examples of such additives are sold under the tradename TINUVIN® Ultraviolet Light Absorbers (UVA) and Hindered-Amine Light Stabilizers (HALS) by the BASF Corporation of Ludwigshafen, Germany. In particular embodiments, TINUVIN® 123-DW (bis (1-octyloxy-2,2,6,-tetramethyl-4-piperidyl) sebacate) and TINUVIN® 400-DW (aqueous dispersion of a 2-hydroxyphenyl-s-triazine (HPT)) may be used.

In some embodiments, fragrances, cross-linking agents, silicones (fillers), and the like, or combinations thereof may be added to the composition.

In addition to the above-described constituents, the protective sealant composition may include a carrier. In certain embodiments, the carrier is water, or more specifically, deionized water. Of course, those skilled in the art will recognize that other carriers with the same properties as water could be used, or still other carriers with different properties could be used with the composition, depending on the particular formulation of the composition.

The protective sealant composition may be applied via a spray, for example, from an aerosol dispensing device. In such a dispensing device, a propellant gas may be added as a constituent to the composition. A specific example of a propellant gas is nitrogen. Of course, other compressed gases may alternatively be used, and further, in other aerosol systems, the composition may be dispensed with a liquefied gas. Those skilled in the art will further recognize that alternative application systems may be used to apply the protective sealant composition, such as a system that sprays the composition without any propellant.

An exemplary formulation of a composition according to an embodiment of the invention is shown in Table 1. This composition will be referred to as Composition A.

TABLE 1

| Constituent | Weight Percent | Function |
|---|---|---|
| aliphatic polycarbonateester-polyether polyurethane dispersion (IMPRANIL ® DLU) | 8.00 | film forming polyurethane dispersion for binding colorant to carpet - forms soft topcoat component |
| aliphatic, anionic polyurethane dispersion (BAYHYDROL ® UH 2558) | 4.00 | film forming polyurethane dispersion for binding colorant to carpet - forms hard topcoat component |
| 2,2,4-trimethyl pentane 1,3-diol monoisobutyrate (TEXANOL ™) | 4.00 | solvent for coalescing and flowing colorant particles into carpet fibers |
| dipropylene glycol n-butyl ether (Dowanol ™ DPnB glycol ether) | 4.00 | solvent for coalescing and flowing colorant particles into carpet fibers |

TABLE 1-continued

Composition A

| Constituent | Weight Percent | Function |
| --- | --- | --- |
| polyacrylic acid/methacrylate block copolymer (PEMULEN ™ TR-2, PEMULEN ™ 1622) | 0.02 | polymeric surfactant to disperse insoluble solvent |
| sodium lauryl sulfate 29% (STEPANOL ® WA-EXTRA PCK) | 0.5 | surfactant for maintaining polyurethane dispersions |
| potassium phosphate dibasic | 0.24 | pH buffer |
| potassium phosphate monobasic | 0.24 | pH buffer |
| oxazolidine 76.2% (BIOBAN ™ CS-1135) | 0.15 | antibacterial |
| 3-iodo-2-propynl butyl carbamate, 20% (ACTICIDE ® IPS 20) | 0.05 | antifungal |
| bis (1-octyloxy-2,2,6-tetramethyl-4-piperidyl) sebacate (TINUVIN ® 123 DW) | 0.06 | free radical scavenger |
| aqueous dispersion of a 2-hydroxy-phenyl-s-triazine (HPT) (TINUVIN ® 400 DW) | 0.06 | UV light absorber |
| deionized water | 78.133 | carrier |
| nitrogen | 0.547 | propellant |

A second exemplary formulation of a composition according to an embodiment of the invention is shown in Table 2. This composition will be referred to as Composition B.

TABLE 2

Composition B

| Constituent | Weight Percent | Function |
| --- | --- | --- |
| aliphatic polycarbonateester-polyether polyurethane dispersion (IMPRANIL ® DLU) | 5.00 | film forming polyurethane dispersion for binding colorant to carpet - forms soft topcoat component |
| aliphatic, anionic polyurethane dispersion (BAYHYDROL ® UH 2558) | 5.00 | film forming polyurethane dispersion for binding colorant to carpet - forms hard topcoat component |
| 2,2,4-trimethyl pentane 1,3-diol monoisobutyrate (TEXANOL ™) | 4.00 | solvent for coalescing and flowing colorant particles into carpet fibers |
| dipropylene glycol n-butyl ether (Dowanol ™ DPnB glycol ether) | 4.00 | solvent for coalescing and flowing colorant particles into carpet fibers |
| polyacrylic acid/methacrylate block copolymer (PEMULEN ™ TR-2, PEMULEN ™ 1622) | 0.02 | polymeric surfactant to disperse insoluble solvent |
| sodium lauryl sulfate 29% (STEPANOL ® WA-EXTRA PCK) | 0.5 | surfactant for maintaining polyurethane dispersions |
| potassium phosphate dibasic | 0.24 | pH buffer |
| potassium phosphate monobasic | 0.24 | pH buffer |
| oxazolidine, 76.2% (BIOBAN ™ CS-1135) | 0.15 | antibacterial |
| 3-iodo-2-propynl butyl carbamate, 20% (ACTICIDE ® IPS 20) | 0.05 | antifungal |

TABLE 2-continued

Composition B

| Constituent | Weight Percent | Function |
| --- | --- | --- |
| bis (1-octyloxy-2,2,6-tetramethyl-4-piperidyl) sebacate (TINUVIN ® 123 DW) | 0.06 | free radical scavenger |
| aqueous dispersion of a 2-hydroxy-phenyl-s-triazine (HPT) (TINUVIN ® 400 DW) | 0.06 | UV light absorber |
| deionized water | 80.133 | carrier |
| nitrogen | 0.547 | propellant |

As will be readily appreciated by those skilled in the art, the formulations of Compositions A and B shown in Tables 1 and 2 could be varied without changing the properties of the composition, and while still obtaining the same results in the tests as described below. Similarly, constituents that provide the same properties as the specifically-named constituents could be substituted without changing the properties of the composition.

EXAMPLES

Protective Sealant Compositions A and B were tested to evaluate the ability of the compositions to seal colorant to carpet, to evaluate the durability to the sealed colorant, and to evaluate the ability of the compositions to prevent resoiling on the carpet. In the tests, Compositions A and B were compared to a third composition that will be referred to herein as Comparative Composition A. Comparative Composition A was formulated differently from Compositions A and B in that Comparative Composition A did not include a film forming polyurethane dispersion that formed a hard topcoat component in the final sealed product. Additionally, Comparative Example Composition A included a plasticizer that could act to soften the carpet fibers in order to promote adhesion with the colorant particles. Comparative Composition A consisted of 81.235 wt. % deionized water, 4 wt. % TEXONAL™, 2 wt. % UNIPLEX 809® (PEG-400 di-2-ethyl-hexoate—the plasticizer) made by Unitex Chemical Corporation of Greensboro, N.C., 0.075 wt. % PEMULEN™ TR-2, 0.24 wt. % potassium phosphate dibasic, 0.24 wt. % potassium phosphate monobasic, 11 wt. % IMPRANIL® DLU, 1.06 wt. % Eastman AQ™ 55S polymer (a water soluble sulfopolyester made by Eastman Chemical Co.), 0.15 wt. % BIOBAN™ CS-1135, and 0.547 wt. % nitrogen gas.

The performance of each of Compositions A and B was also compared to the performance of products marketed as carpet protecting sprays. One of the products was VECTRA® carpet spray made by Vectra Spray of Atlanta, Ga., referred to as Comparative Composition B. The second product was SCOTCHGARD™ Carpet and Upholstery Protector manufactured by 3M Company of St. Paul, Minn., referred to as Comparative Composition C.

The colorant used for the tests was a VECCO™ sage-colored carpet colorant manufactured by S.C. Johnson & Son, Inc., of Racine, Wis. VECCO™ is a uniform distribution of colorant particles in a resin that is suspended in a liquid. A further description of this and other colorants can be found in U.S. Pat. No. 7,727,289, which is incorporated herein by reference in its entirety.

In some of the tests, a VERICOLOR® Spectro Non-Contact Spectrophotometer manufactured by X-rite, Inc. of Grand Rapids, Mich., was used to quantify the color changes in the carpet samples, along with corresponding Color iQC software provided by the spectrophotometer manufacturer. As will be appreciated by those skilled in the art, the spectrophotometer readings can be quantified using different standards. For the tests described herein, the spectrophotometer readings were interpreted as CIE L*, a*, b* (CIELAB) color space, where L* represents lightness, and where a* and b* represent color-component dimensions, based on nonlinearly compressed CIE XYZ color space coordinates. Thus, in the context of the present tests, an increase in L* represented a lightening of the color of the sample, an increase in a* represented a change in a scale from green to magenta, and an increase in b* represented a change in a scale from blue to yellow. In other words, an increase in L* would represent the color sample fading, and changes in a* and b* would represent shifts in the color of the sample.

The spectrophotometer readings were also used to determine $\Delta E_{CMC}$ values for the samples. As will be appreciated by one of ordinary skill in the art, $\Delta E_{CMC}$ (which is based on L*, a*, and b* values) represents the total color difference value in a system, with the $\Delta E_{CMC}$ being an indicator of the difference between a sample and a particular standard. In the context of the tests herein, $\Delta E_{CMC}$ represented the overall color difference in the carpet samples after the simulated wearing processes described below, with the standard being the carpet samples before the wearing processes. Note that, for all of the tests herein, a lightness to chroma ratio (1:c) of 2:1 was used for the $\Delta E_{CMC}$.

As will further be appreciated by one of ordinary skill in the art, $\Delta C_{CMC}$ is one of the variables that is used to calculate the $\Delta E_{CMC}$, with the $\Delta C_{CMC}$ representing a change in the chroma of the sample from a standard. In the context of the carpet wearing tests described below, the $\Delta C_{CMC}$ is an indicator of resoiling of the sample, with the negative value of $\Delta C_{CMC}$ indicating that the color is becoming darker from, for example, dirt or other matter, i.e., resoiling.

In the tests involving the spectrophotometer readings, each spectrophotometer measurement was the average of measurements taken at three positions on each sample, with measurements being taken twice at each location. More specifically, a first measurement was taken at a particular location on a sample, the spectrophotometer was rotated by ninety degrees, and the measurement was taken again. The spectrophotometer was then moved to two other locations on the sample, and two measurements were taken at each of these locations. Thus, the measurements for each sample reflect a well-established average for the sample.

Test 1—Color Durability and Prevention of Resoiling

In Test 1, the ability of each of Compositions A and B to provide color durability and to prevent resoiling was determined and compared to the color durability and prevention of resoiling by Comparison Composition A. In this test, two foot by three foot samples of carpet were obtained. The carpet was a textured cut pile polyester fiber carpet manufactured by Mohawk Industries of Calhoun, Ga., having a 1/10 gauge, a pile height of 0.596 inches, 8.50 stitches per inch, a certified pile weight of 58.80 ounces, a total weight of 93.23 ounces, and a density of 3552 ounces/cubic yard.

The above-described VECCO™ sage-colored colorant was applied to the carpet samples. A procedure was used to ensure that each sample received approximately the same amount of colorant and that the colorant was applied in the same pattern on each sample. More specifically, about 1 g/in² of formula (about 0.05 g/in² of colorant particle) was applied to each sample. Further, templates were used to ensure that the colorant was applied in the same pattern on the samples.

After the colorant had dried, the compositions to be tested were applied to the colored carpet samples. About 1 g/in² of the compositions (about 0.05 g/in³ of sealant particle) was applied to each sample. A consistent amount of composition was applied to each of the carpet samples through the use of a developed procedure. The sealed samples were left to dry for ten days after application of colorant and sealant, prior to further testing.

The carpet samples treated with the compositions were then walked on in order to simulate actual wear and tear on the carpet. Specifically, 30,000 footsteps were taken over the prepared samples. The 30,000 footstep test was conducted according to protocol developed from ASTM D 6119-D "Standard Practice for Creating Surface Appearance Changes in Pile Yarn Floor Covering from Foot Traffic." In the tests, carpet tracks with the carpet samples were created, and a motion sensor was used to monitor the progress of walkers stepping on each sample over the course of six days until 30,000 steps were taken on each of the samples.

To simulate carpet cleaning, 600 vacuum strokes were given to each sample during the course of the 30,000 footstep test, with approximately 100 vacuum strokes being applied during each day of the footstep test. The vacuum cleaner was, for example, a HOOVER® WINDTUNNEL® T-SERIES™ Model #UH70120, made by The Hoover Company of Glenwillow, Ohio, or as another example, a POWERFORCE® Turbo Vacuum, Model 6585, made by Bissell, Inc. of Walker, Mich. was used. A procedure was developed so as ensure that consistent vacuum stroking was used on each sample.

Readings were taken with the above-described spectrophotometer (i) before the walking and vacuuming, (ii) after 15,000 steps, and (iii) after 30,000 steps, with the readings being taken according to the procedures described above. The spectrophotometer readings for Test 1 are shown in Table 3.

TABLE 3

| Composition | Steps | $\Delta E_{CMC}$ | $\Delta C_{CMC}$ | L* | a* | b* |
|---|---|---|---|---|---|---|
| Composition A - | 0 | — | — | 47.52 | 0.20 | 15.61 |
| Sample 1 | 15,000 | 4.66 | −2.59 D | 52.17 | 0.35 | 13.48 |
|  | 30,000 | 5.44 | −2.84 D | 55.61 | 0.48 | 13.56 |
| Composition A - | 0 | — | — | 46.53 | 0.21 | 16.88 |
| Sample 2 | 15,000 | 5.42 | −2.77 D | 52.44 | 0.51 | 13.72 |
|  | 30,000 | 5.44 | −2.99 D | 55.98 | 0.61 | 13.71 |
| Composition B - | 0 | — | — | 42.69 | 0.22 | 15.22 |
| Sample 1 | 15,000 | 4.04 | −1.70 D | 49.97 | 0.50 | 12.76 |
|  | 30,000 | 5.41 | −1.65 D | 52.93 | 0.58 | 12.82 |
| Composition B - | 0 | — | — | 43.29 | 0.15 | 15.61 |
| Sample 2 | 15,000 | 4.01 | −1.87 D | 50.34 | 0.56 | 12.86 |
|  | 30,000 | 5.80 | −1.84 D | 54.25 | 0.71 | 12.90 |
| Comparison | 0 | — | — | 43.17 | 0.10 | 14.78 |
| Composition A | 15,000 | 7.25 | −1.79 D | 57.03 | 1.07 | 12.18 |

As can be seen from the results of Test 1 shown in Table 3, Compositions A and B were effective in both sealing the colorant and preventing the resoiling of the samples. More specifically, the $\Delta E_{CMC}$ after 30,000 steps was 5.44 for Composition A, and 5.41 and 5.80 for Composition B. On the other hand, the $\Delta E_{CMC}$ of Comparison Composition A was 7.25 after only 15,000 steps. Without wishing to be bound by any theory, we believe that the combination of a hard topcoat and a soft topcoat component provided the combination of sealing and protection that was found in each of Compositions A and B, but was lacking in Comparison Composition A. In sum, Test 1 shows that Compositions A and B can each seal and protect a colorant applied to a polyester fiber carpet such that, after the carpet is walked on by 30,000 steps and vacuumed by 600 strokes, the $\Delta E_{CMC}$ (1:c=2:1) for the colored portion of the carpet is less than about 6.0 and the $\Delta C_{CMC}$ is less than about −3.0 D.

Test 2—Non-Colored Durability and Prevention of Resoiling

In Test 2, Compositions A and B were tested with carpet samples to which no colorant had been applied. More specifically, the ability of Compositions A and B and Comparison Compositions B and C to provide durability of non-colored carpet samples and to prevent resoiling of the non-colored carpet sample was determined. For these tests, the above-described polyester carpet was again used.

The non-colored carpet samples were prepared in the same manner described above in Test 1, except that no colorant was applied to the samples, and the samples were subjected to the simulated 30,000 footsteps and 600 vacuum strokes in the same manner as the samples of Test 1. For reference, a non-colored carpet sample was also tested without any composition being applied to the sample. The results of Test 2 are shown in Table 4.

TABLE 4

| Composition | Steps | $\Delta E_{CMC}$ | $\Delta C_{CMC}$ |
|---|---|---|---|
| Composition A - Sample 1 | 15,000 | 2.37 | −1.45 D |
|  | 30,000 | 2.49 | −1.83 D |
| Composition A - Sample 2 | 15,000 | 1.95 | −1.30 D |
|  | 30,000 | 2.22 | −1.99 D |
| Composition B - Sample 1 | 15,000 | 2.86 | −1.15 D |
|  | 30,000 | 2.38 | −1.60 D |
| Composition B - Sample 2 | 15,000 | 2.39 | −1.13 D |
|  | 30,000 | 3.01 | −1.61 D |
| Comparison Composition B | 15,000 | 2.59 | −0.93 D |
|  | 30,000 | 2.35 | −1.34 D |
| Comparison Composition C | 15,000 | 3.11 | −1.55 D |
|  | 30,000 | 2.82 | −1.26 D |
| None | 15,000 | 3.48 | −1.91 D |
|  | 30,000 | 2.39 | −1.44 D |

As can be seen from the results of Test 2, Compositions A and B each protected the carpet samples nearly as well as the Comparison Compositions B and C. That is, the relatively comparable $\Delta E_{CMC}$ of Compositions A and B and Comparison Compositions B and C indicate that Compositions A and B were nearly as effective at preventing the carpet from being discolored by foot traffic. Further, the relatively comparable $\Delta C_{CMC}$ of Compositions A and B and Comparison Compositions B and C indicates that the Compositions A and B were nearly as effective at preventing resoiling of the carpet. In sum, Compositions A and B protected the carpet samples almost as well as the compositions marketed for the specific purpose of protecting a carpet surface.

Test 3—Ability to Seal Colorant to Carpet

Test 3 was conducted in order to evaluate the ability of each of Compositions A and B to seal a colorant to a carpet as compared to the ability of Comparison Compositions B and C to seal the colorant to a carpet.

In this test, six identical carpet samples of the above-described polyester carpet were prepared. Each carpet sample was twelve inches in diameter. One gram per square inch of the above-described VECCO™ sage-colored colorant was applied to each carpet sample, and the samples were allowed to dry for several days. Once dry, one gram per square inch of Compositions A and B and Comparative Composition A were each applied to a carpet sample. Comparative Composition B was applied to a carpet sample pursuant to its label instructions that specify the application of a light mist that does not saturate the carpet. Composition C was also applied to a carpet sample so as to cover the sample. No additional composition was applied to the colorant on the sixth carpet sample.

After ten days of drying, the L*, a*, and b* readings were measured in three locations on the colorant samples using the above-described VERICOLOR® spectrophotometer procedure. The carpets were vacuumed for 100 strokes, and then the L*, a*, and b* parameters of the samples were again determined, and the $\Delta E_{CMC}$ was calculated using the spectrophotometer.

The results of Test 3 are shown in Table 5 below, along with the data for the sample that did not have any composition applied to it, and the sample that did not have any colorant or composition applied to it.

TABLE 5

| Composition | Vacuum Strokes | $\Delta E_{CMC}$ | L* | a* | b* |
|---|---|---|---|---|---|
| Composition A | 0 | — | 43.11 | 0.44 | 16.16 |
|  | 100 | 1.53 | 45.56 | 0.38 | 14.78 |
| Composition B | 0 | — | 44.84 | 0.33 | 16.76 |
|  | 100 | 1.03 | 46.22 | 0.34 | 15.57 |
| Comparison Composition A | 0 | — | 44.46 | 0.48 | 15.43 |
|  | 100 | 1.51 | 46.79 | 0.46 | 14.00 |
| Comparison Composition B | 0 | — | 50.25 | 0.32 | 15.77 |
|  | 100 | 9.05 | 69.30 | 2.36 | 15.37 |
| Comparison Composition C | 0 | — | 51.99 | 0.31 | 14.33 |
|  | 100 | 8.09 | 69.07 | 2.37 | 15.52 |
| None (color only) | 0 | — | 51.36 | 0.01 | 15.86 |
|  | 100 | 8.61 | 69.36 | 2.39 | 15.29 |
| None (no color) | — | — | 68.66 | 2.50 | 15.44 |

The results of Test 3 demonstrate that each of Compositions A and B, as well as Comparative Composition A, effectively sealed the colorant on the carpet. That is, there was very little change in the L*, a*, and b* readings, and little change in the $\Delta E_{CMC}$ value before and after vacuuming of the samples that were treated with Compositions A and B and Comparative Composition A. On the other hand, Comparative Compositions B and C failed to seal the colorant, as the L*, a*, and b* readings and the $\Delta E_{CMC}$ value for Comparison Compositions B and C changed in the same manner as the sample to which a colorant was applied without any additional composition.

The results of Tests 2 and 3 collectively indicate that each of Compositions A and B was as effective at protecting the color of a polyester fiber carpet surface and preventing resoiling in the carpet surface as Comparison Compositions B and C, which are marketed as carpet protecting products. Compositions A and B, however, were also effective in sealing the colorant to the carpet, whereas Comparison Compositions B and C were completely ineffective in sealing the colorant. Quantitatively, for Compositions A and B, after the carpet is walked upon by 30,000 steps and vacuumed by 600 strokes, the $\Delta E_{CMC}$ (1:c=2:1) value for the portion of carpet to which no colorant is applied is less than about 3.0 and the $\Delta C_{CMC}$ value is less than about −2.0 D, and the $\Delta C_{CMC}$ of the portion of the carpet to which no colorant is applies is less than about 1.55 after the portion of carpet to which the colorant is applied is vacuumed by 100 strokes.

Test 4—Providing Wear Resistance

After a period of use, low-traffic areas of a carpet surface may appear to be different than higher-traffic areas of the carpet. Such differences are usually unattractive. Without being bound to a particular theory, it is believed that the visual differences in the low and high traffic areas of carpet may, at least partly, be related to the free ends, i.e., top ends, of the carpet fibers in the low and high traffic areas, having different widths. As the carpet is worn by traffic, the top ends of the fibers unravel and become more spread out, that is, the widths of the free ends of the carpet fibers increase. Thus, the carpet fibers in the higher traffic areas will have greater widths at their top ends than the carpet fibers in the lower traffic areas. It follows that the higher traffic areas of the carpet surface will look different than the lower traffic areas of the carpet surface.

A simulated wear test was conducted to ascertain the ability of Compositions A and B, and Comparison Compositions A, B, and C, to provide wear resistance to carpet in terms of the ability of the respective composition to prevent the widths of the top ends of the fibers from increasing. For this test, six samples of carpet were obtained. The carpet was the nylon fiber carpet "Sandy Hollow II Mushroom" manufactured by Shaw's Industries, Inc., of Dalton, Ga. Each sample was 34.5 inches by 11.0 inches, with a 1/10 gauge, a face weight of 48.80 ounces/square yard, a finished pile thickness of 0.56 inches, a total weight of 87.0 ounces/square yard, and a density of 3137 ounces/cubic yard. The free ends of the carpet fibers, i.e., the ends of the fibers that form the top of the carpet surface, were photographed adjacent to a ruler according to the procedure described below, and the average width of the fibers was found to be about 0.118 inches.

Compositions A and B, and Comparison Compositions A, B, and C, were applied to an area of about 190 cm$^2$ of the samples. Specifically, an amount of 114.24 grams of Composition A was applied, an amount of 108.80 grams of Composition B was applied, and an amount of 108.83 grams of Comparison Composition A was applied. Note that the result was about 0.6 g/cm$^2$ for these compositions. In the case of Comparison Composition B, 52.27 grams was applied, and 25.52 grams of Comparison Composition B was applied. The amounts of Comparison Compositions B and C applied were based on the label instructions for these products. The samples were allowed to dry at room temperature for at least ten days. The sixth carpet sample was not treated with any composition.

The wear on each of the prepared treated carpet samples and untreated sample was simulated by repeatedly contacting the samples with a steel beater bar covered with nylon. The steel beater bar was 3.0 inches in diameter and weighed about 22.5 pounds. Six rows of 5/8 inch square nylon strips were screwed into the beater bar. Each of the samples was laid flat against the inside surface of a cylindrical drum, and the steel beater bar was placed inside the drum. The drum was 12.5 inches in height, had a 12 inch inner diameter, and a 12.75 outer diameter. The drum was closed and made to rotate at a rate of about thirty-five rotations per minute for about seventy-two hours. Upon completion of the simulated wearing by contact with the beater bar in the drum, the carpet samples were removed and allowed to rest face-up on a flat surface for at least twenty-four hours.

Figure 1A:
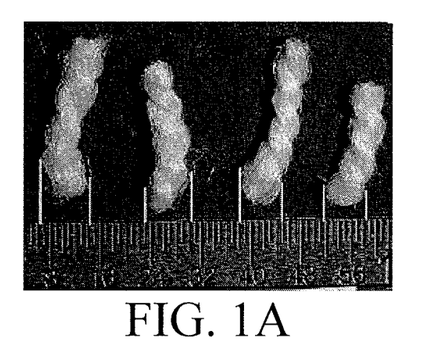
FIGS. 1A, 1B, and 1C show photographs of carpet fibers as part of a simulated wear test.
Figure 1B:
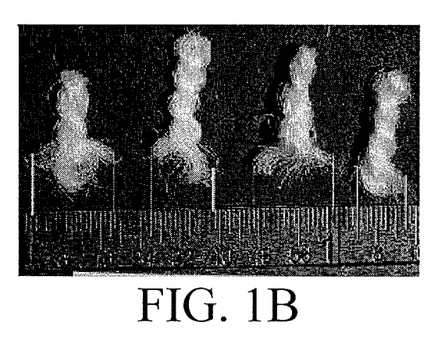
Figure 1C:
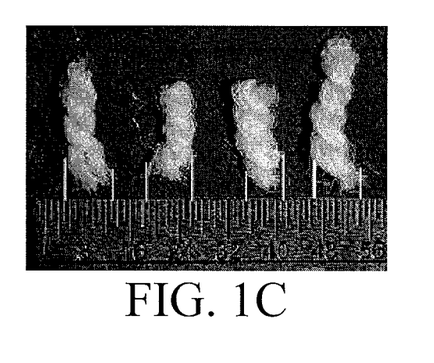

The widths of the free ends of the carpet fibers for the wear-tested samples were then determined. For this determination, each sample was evenly divided into nine quadrants, and four adjacent fibers were cut from each quadrant. Each group of four fibers was then separated into individual fibers. The individual fibers were then photographed adjacent to a ruler from a distance of about five inches. Examples of such photographs are shown in FIGS. 1A, 1B, and 1C. As can be seen in the photographs, the carpet fibers subjected to the wear-testing have a distinct unraveling at their free ends that can be closely measured. Note, for example, that the ends of the carpet fibers shown in FIG. 1B have become more unraveled than the ends of the carpet fibers shown in FIG. 1C.

The average width of the measured fibers of each sample was calculated. The results of the simulated wear test are shown in Table 6.

TABLE 6

| Sample | Average Fiber Width After Wearing (inches) | Change in Fiber Width (inches) | % Change in Fiber Width |
|---|---|---|---|
| Composition A | 0.121 | 0.003 | 2.8 |
| Composition B | 0.127 | 0.009 | 7.3 |
| Comparison Composition A | 0.133 | 0.015 | 11.4 |
| Comparison Composition B | 0.177 | 0.058 | 33.1 |
| Comparison Composition C | 0.170 | 0.052 | 30.6 |
| Untreated Carpet | 0.161 | 0.042 | 26.7 |

The results of Test 4 demonstrate that Compositions A and B were highly effective at providing a wear resistance to the nylon carpet fibers. The width of the free ends of the fibers treated with Compositions A and B increased by less than 10% (about 0.010 inches) as a result of the simulated wear test with the beater bar. More specifically, the free end width of the fibers in the sample treated with Composition B increased by about 7%, and the free end width of the fibers in the sample treated with Composition A increased by only about 3%. On the other hand, Comparison Compositions B and C failed to provide any wear resistance, at least in terms of the amount that the widths of the free ends of the fibers increase in the simulated wear test. That is, the widths of the free ends of the fibers treated with Comparison Compositions B and C actually increased in the simulated wear test compared to the amount that the widths of the fibers increased in the untreated sample. Without wishing to be bound by theory, the Comparison Compositions B and C may have caused the free ends of the carpet fibers to be less tightly bound, and as result, subject to more unraveling and increasing width upon being subjected to the wear test with the beater bar.

As discussed above, the unattractive visual differences between the areas of a carpet that receive low traffic and the areas of the carpet that receive high traffic may at least partly be related to the widths of the free ends of the carpet fibers. The ability of Compositions A and B to greatly reduce the increase in widths of the free ends of nylon carpet fibers upon wearing indicates that the compositions are highly effective at providing wear resistance to the fibers. Thus, Compositions A and B are formulated to provide a wear resistance that maintains the appearance of a nylon carpet surface.

Tests 1, 2, 3, and 4 collectively show that each of Compositions A and B was highly effective in sealing colorant to carpet, highly effective in providing durability to the sealed colorant, highly effective in preventing resoiling of both the colored and non-colored portions of carpet, and highly effective at imparting wear resistance to the carpet in teems of reducing the amount that the widths of the top ends of the carpet fibers increase when the carpet is subjected to wearing. As discussed above, we believe that the combination of hard and soft topcoat components that are provided with Composition A and B may be responsible for at least some of the functionalities of these compositions.

Although this invention has been described in terms of certain specific embodiments, many additional modifications and variations would be apparent to those skilled in the art in light of this disclosure. It is, therefore, to be understood that this invention may be practiced otherwise than as specifically described. Thus, the embodiments of the invention discussed above should be considered in all respects to be illustrative and not restrictive, and the scope of the invention to be determined by any claims supportable by this application and the equivalents thereof, rather than by the foregoing description.

Industrial Applicability

The protective sealant compositions disclosed can be used as a process of applying and affixing a colorant to a surface, such as carpeting. By applying, sealing, and protecting such a colorant, the perceived aesthetic quality of the surface is improved and may extend the useful life of the surface before the need for replacement.

We claim:

1. A. composition for sealing a colorant that is applied to a polyester fiber carpet, the composition comprising:
a film forming polyurethane dispersion including (i) a first film forming polyurethane dispersion and (ii) a second film forming polyurethane dispersion, wherein the film forming polymyethane dispersion forms a film when applied to the polyester fiber carpet, and the film, upon drying, forms a topcoat on the polyester fiber carpet, wherein the first film forming polyurethane dispersion forms a hard component of the topcoat, and wherein the second film forming polyurethane dispersion forms a soft component of the topcoat; and
a solvent for coalescing particles of a carpet colorant and causing the particles to flow into carpet fibers when composition is applied to the polyester fiber carpet,
wherein, when the composition is dried on a portion of the polyester fiber carpet, to which the carpet colorant is applied, the composition seals and protects the portion of the polyester fiber carpet to which the colorant is applied such that, after the polyester fiber carpet is walked on by 30,000 steps and vacuumed by 600 strokes, the $\Delta E_{CMC}$ (1:c=2:1) of the portion of the polyester fiber carpet to which the colorant is applied is less than about 6.0, and the $\Delta C_{CMC}$ of the portion of the polyester fiber carpet to which the colorant is less than about −3.0 D, and
wherein the composition is formulated as an aerosol spray.

2. A composition according to claim 1, wherein, after the polyester fiber carpet is walked on by 30,000 steps and vacuumed by 600 strokes, the $\Delta E_{CMC}$ (1:c=2:1) of the portion of the polyester fiber carpet to which the colorant is less than about 5.45, and the $\Delta C_{CMC}$ of the portion of the polyester fiber carpet to which the colorant is applied is less than about −3.0 D.

3. The composition according to claim 1, wherein, after the polyester fiber carpet is walked on by 30,000 steps and vacuumed by 600 strokes, the $\Delta E_{CMC}$ (1:c =2:1) of the portion of the polyester fiber carpet to which the colorant is applied is less than about 5.80, and the $\Delta C_{CMC}$ of the portion of the polyester fiber carpet to which the colorant is less than about −1.84 D.

4. The composition according to claim 1, wherein the composition includes one of a compressed gas propellant and a liquefied gas propellant.

5. The composition according to claim 1, wherein the first film forming polyurethane dispersion and the second film forming dispersion are in ratio of from about 1:1 to about 1:2.

6. A composition that prevents color change in a polyester fiber carpet, the composition comprising:
a film forming polyurethane dispersion including (i) a first film forming polyurethane dispersion and (ii) a second film forming polyurethane dispersion, wherein the first film forming polyurethane dispersion and the second film forming dispersion are in a ratio of from about 1:1 to about 1:2, wherein the film forming polyurethane dispersion form a film when applied to the polyester fiber carpet, and the film, upon drying, forms a topcoat on the polyester fiber carpet, wherein the first film forming polyurethane dispersion forms a hard component of the topcoat, and wherein the second film forming polyurethane dispersion form a soft component of the topcoat; and
a solvent for coalescing particles of a carpet colorant and causing the particles to flow into carpet fibers when the composition is applied to the polyester fiber carpet,
wherein, when the composition is dried on a portion of the polyester fiber carpet fiber, to which the carpet colorant is applied, the composition protects against color change in the portion of the polyester fiber carpet such that, after the polyester fiber carpet is walked on by 30,000 steps and vacuumed by 600 strokes, the $\Delta E_{CMC}$ (1:c=2:1) of the portion of the polyester fiber carpet is less than about 3.0, and the $\Delta C_{CMC}$ of the portion of the polyester fiber carpet is less than about −2.0 D, and
wherein the composition is formulated as an aerosol spray.

7. The composition according to claim 6, wherein the composition protects the portion of the polyester fiber carpet such that, after the polyester fiber carpet is walked on by 30,000 steps and vacuumed by 600 strokes, the $\Delta E_{CMC}$ (1:c=2:1) of the portion of the polyester fiber carpet is less than about 2.49, and the $\Delta C_{CMC}$ of the portion of the polyester fiber carpet is less than about −1.99 D.

8. The composition according to claim 6, wherein the composition protects the portion of the polyester fiber carpet such that, after the portion of the polyester fiber carpet is walked on by 30,000 steps and vacuumed by 600 strokes, the $\Delta E_{CMC}$ (1c:=2:1) of the portion of the polyester fiber carpet is less than about 2.22, and the $\Delta C_{CMC}$ of the portion of the polyester fiber carpet is less than about −1.61 D.

9. The composition according to claim 6, wherein the composition includes one of a compressed gas propellant and a liquefied gas propellant.

10. A composition for sealing and protecting a colorant that is applied to a polyester fiber carpet and for protecting polyester fiber carpet, the composition comprising;
a film forming polyurethane dispersion including (i) a first film forming polyurethane dispersion and (ii) a second film forming polyurethane dispersion, wherein the film forming polyurethane dispersion is 12 wt. % or less of the composition, wherein the film forming polyurethane dispersion forms a film when applied to the polyester fiber carpet, and the film, upon drying, forms a topcoat on the polyester fiber carpet, wherein the first film forming polyurethane dispersion forms a hard component of the topcoat, wherein the second film forming polyurethane dispersion forms a soft component of the topcoat; and
a solvent for coalescing particles of a carpet colorant and causing the particles to flow into carpet fibers when the composition is applied to the polyester fiber carpet,
wherein, when the composition is dried on a portion of the polyester fiber carpet, to which colorant is applied, the composition seals and protects the portion of the polyester fiber carpet to which no colorant is applied such that, after the portion of the polyester fiber carpet is walked on by 30,000 steps and vacuumed by 600 strokes, the $\Delta E_{CMC}$ (1:c=2:1) of the no colorant portion of the polyester fiber carpet is less than about 3.0, and the $\Delta C_{CMC}$ of the no colorant portion of the polyester fiber carpet is less than about −2.0 D,
wherein, the composition seals the colorant to the polyester fiber carpet such that the $\Delta E_{CMC}$ (1:c=2:1) of the portion of the polyester fiber carpet to which the colorant is applied is less than about 1.55 after the portion of polyester fiber carpet to which the colorant is applied is vacuumed by 100 strokes.

11. A composition according to claim 10, wherein the composition seals and protects the portion of the polyester fiber carpet to which no colorant is applied such that, after the no colorant portion of the polyester fiber carpet is walked on by 30,000 steps and vacuumed by 600 strokes, the $\Delta E_{CMC}$ (1:c=2:1) of the no colorant portion of the polyester fiber carpet is less than about 2.49, and the $\Delta C_{CMC}$ of the no colorant portion of the polyester fiber carpet is less than about −1.99 D, and wherein the composition seals the colorant to the polyester fiber carpet such that the $\Delta E_{CMC}$ (1:c=2:1) of the portion of the polyester fiber carpet to which the colorant is applied is less than about 1.53 after the portion of polyester fiber carpet to which the colorant is applied is vacuumed by 100 strokes.

12. A composition according to claim 10, wherein the composition seals and protects the portion of the polyester fiber carpet to which no colorant is applied such that, after the no colorant portion of the polyester fiber carpet is walked on by 30,000 steps and vacuumed by 600 strokes, the $\Delta E_{CMC}$ (1:c=2:1) of the no colorant portion of the polyester fiber carpet is less than about 2.22, and the $\Delta C_{CMC}$ of the no colorant portion of the polyester fiber carpet is less than about −1.61 D, and wherein the composition seals the colorant to the polyester fiber carpet such that the $\Delta E_{CMC}$ (1:c=2:1) of the portion of the polyester fiber carpet to which the colorant is applied is less than about 1.03 after the portion of polyester fiber carpet to which the colorant is applied is vacuumed by 100 strokes.

13. A composition according to claim 10, wherein, after the polyester fiber carpet is walked on by 30,000 steps and vacuumed by 600 strokes, the $\Delta E_{CMC}$ (1:c=2:1) of the portion of the polyester fiber carpet to which the colorant is applied is less than about 5.45, and the $\Delta C_{CMC}$ of the portion of the polyester fiber carpet to which the colorant is applied is less than about −3.0 D.

14. The composition according to claim 10 wherein, after the polyester fiber carpet is walked on by 30,000 steps and vacuumed by 600 strokes, the $\Delta E_{CMC}$ (1:c=2:1) of the portion of the polyester fiber carpet to which the colorant is applied is less than about 5.80, and the $\Delta C_{CMC}$ of the portion of the polyester fiber carpet to which the colorant is applied is less than about −1.84 D.

15. The composition according to claim 10. wherein the composition is formulated as an aerosol spray.

16. The composition according to claim 15, wherein the composition includes one of a compressed gas propellant and a liquefied gas propellant.

17. The composition according to claim 10, wherein the first film forming polyurethane dispersion and the second film forming dispersion are in a ratio of from about 1:1 to about 1:2.

* * * * *